United States Patent [19]

Sun et al.

[11] Patent Number: 5,247,363
[45] Date of Patent: Sep. 21, 1993

[54] ERROR CONCEALMENT APPARATUS FOR HDTV RECEIVERS

[75] Inventors: Huifang Sun, Princeton; Joel W. Zdepski, Lebanon, both of N.J.

[73] Assignee: RCA Thomson Licensing Corporation, Princeton, N.J.

[21] Appl. No.: 844,322

[22] Filed: Mar. 2, 1992

[51] Int. Cl.⁵ .............................................. H04N 5/21
[52] U.S. Cl. .................................. 358/167; 358/105; 358/336
[58] Field of Search ........................ 358/105, 336, 167

[56] References Cited

U.S. PATENT DOCUMENTS

| | | | |
|---|---|---|---|
| 4,021,852 | 3/1977 | Hurst et al. | 360/38 |
| 4,232,340 | 4/1980 | Fuhrer | 358/167 |
| 4,792,953 | 12/1988 | Pasdera | 358/336 |
| 4,807,033 | 2/1989 | Keesen | 358/167 |
| 5,003,541 | 3/1991 | Mester | 358/336 |
| 5,122,875 | 6/1992 | Raychaudhuri | 358/135 |

OTHER PUBLICATIONS

ISO-IEC JTC1/SC2/WG11; Coding of Moving Pictures and Associated Audio; MPEG 90/176 Rev. 2, Dec. 18, 1990.

*Primary Examiner*—Howard W. Britton
*Attorney, Agent, or Firm*—Joseph S. Tripoli; Eric P. Herrmann; Ronald H. Kurdyla

[57] ABSTRACT

Image reproduction is improved in an MPEG-like television receiver by inclusion of post-processing adaptive error concealment. Compressed video signal is examined to determine blocks of video signal containing errors, and error tokens are generated for identifying corresponding blocks of decompressed pixel values. Pixel values adjacent the decompressed blocks of pixel values containing errors are examined to generate estimates of the relative image motion and image detail in the area of such blocks. The block of pixel values is replaced with temporally displaced co-located blocks of pixel values or interpolated data depending upon whether the estimate of image motion is lesser or greater than the estimate of image detail.

10 Claims, 4 Drawing Sheets

ERROR CONCEALMENT APPARATUS FOR HDTV RECEIVERS

This invention relates to methods and apparatus for concealing image errors in decoded television signals which were transmitted in compressed form.

BACKGROUND OF THE INVENTION

Currently much effort is being expended in developing apparatus for transmitting video signals, for high definition television, (HDTV), telephonic applications, interactive video applications etc. One very attractive approach is known as motion compensated predictive encoding. The International Organization for Standardization is currently developing a standard specifying the coded representation of video for digital storage media, based on a variant of this type of encoding. This standard supports a continuous data transfer rate of 1.5 Mbits/sec., and is described in the document ISO-IEC JTC1/SC2/WG11; CODING OF MOVING PICTURES AND ASSOCIATED AUDIO; MPEG90/176 Rev.2, Dec. 18, 1990. This format has become known as MPEG. According to this format sequences of frames are divided into groups, and respective frames within each group are encoded according to one of a plurality of coding modes. Typically the coding modes include intraframe coding, (I frames) and two types of interframe predictive coding (P and B frames).

The Advanced Television Research Consortium (ATRC) in the United States has developed an HDTV system based upon the MPEG format, for transmission of high definition television (HDTV) signals in digital form. This HDTV System is described in U.S. Pat. No. 5,122,875. In the HDTV system developed by the ATRC, video signal compressed according to an MPEG like format is arranged in service type specific transport packets for transmission. These packets undergo a first level of error encoding, to generate a frame check sequence FCS, e.g., a cyclic redundancy check, and FCS error check codes are appended to the transport packets. Thereafter the transport packets, with the appended error check codes, undergo a forward error coding, FEC, such as a Reed-Solomon coding, and FEC error detection/correction codes are appended to the data.

At the receiver, transmitted information is detected and applied to an FEC decoder, which performs a limited error correction function on the transmitted data. The FEC corrects the majority of errors incurred during transmission, however because the error check overhead volume is limited by bandwidth constraints, some errors will pass the FEC decoder without detection/correction. The FEC decoded signal is then coupled to an FCS decoder. The FCS decoder is capable of detecting but not correcting data. If an error is detected in a transport packet, the entire transport packet is discarded.

The discarded transport packets may thereafter be replaced with synthesized compressed data. An example of apparatus for performing pre-decompression error concealment is described in copending application Ser. No. 07/789,245 filed Nov. 7, 1991 and entitled "Apparatus For Concealing Errors In A Digital Video Processing System." In this system the FCS decoder generates error tokens which indicate when data has been discarded. Responsive to the error tokens the system substitutes predetermined sequences of compressed data for discarded data. The data is then decompressed for display or storage purposes. Depending upon the type of data that is lost, replacement by synthesized compressed data may not produce satisfactory images.

SUMMARY OF THE INVENTION

The present invention is directed to post decompression error concealment, for performing further signal replacement over image areas represented by synthesized data. The image areas represented by synthesized data are identified by error tokens which are carried along with the decompressed video data. When an image area is identified with data that has been discarded, adjacent decompressed image areas are examined for motion and detail. Depending upon the relative amount of motion or detail in adjacent image areas, the current image area is replaced with spatially synthesized or temporally co-located data respectively.

DETAILED DESCRIPTION

Figure 1:
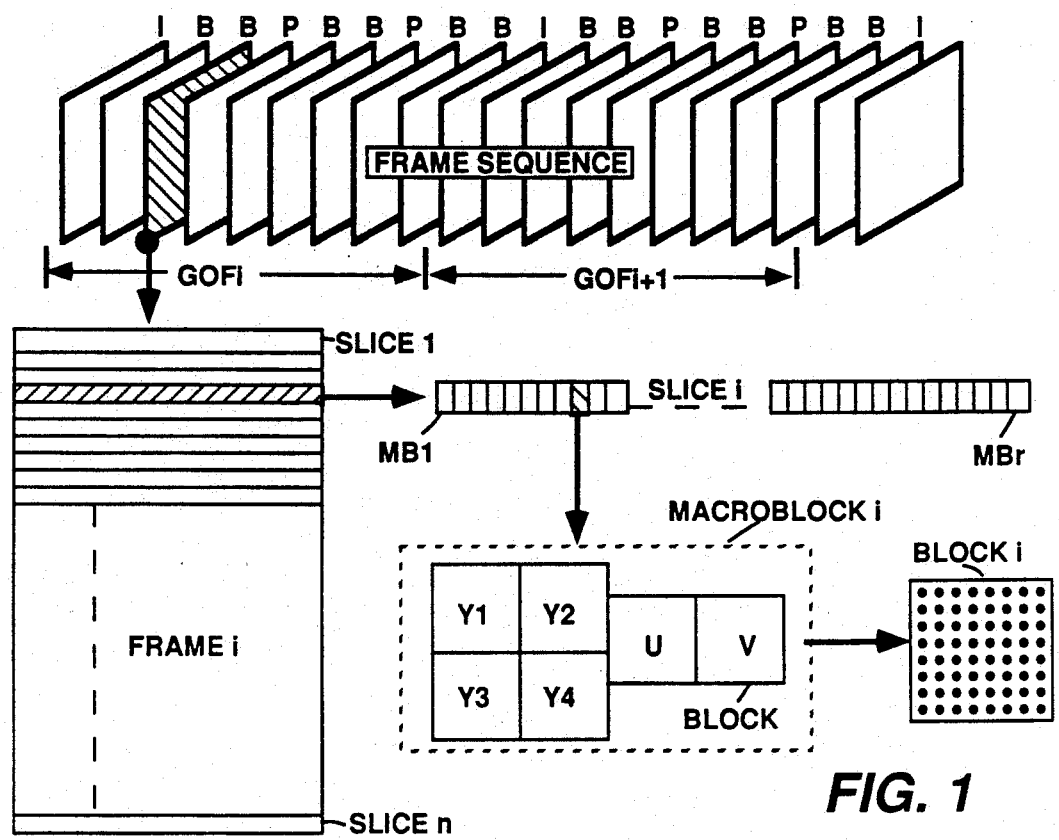
FIG. 1 is a pictorial representation of the MPEG-like signal coding hierarchy.

Before describing the invention, the MPEG-like compressed signal format will be described with reference to FIGS. 1 and 2. The MPEG protocol divides successively occurring frames into sequences or groups of frames, GOF. The frames in respective GOF's are compressed according to three processes, intraframe coding (I frames), forward interframe coding (P frames) and forward/backward interframe coding (B frames). Respective frames of coded data are divided into slices representing, for example, 16 image lines. Each slice is divided into macroblocks each of which represents, for example, a 16×16 matrix of pixels. Each macroblock is divided into 6 blocks including four blocks of information relating to luminance signal and two blocks of information relating to chrominance signal. The luminance and chrominance information are coded separately and then combined for transmission. The luminance blocks include data relating to respective 8×8 matrices of pixels. Each chrominance block comprises an 8×8 matrix of data relating to the entire 16×16 matrix of pixels represented by the macroblock.

Blocks of data, encoded according to intraframe coding, consist of matrices of Discrete Cosine Coefficients. That is, respective 8×8 blocks of pixels are subjected to a Discrete Cosine Transform (DCT) to provide coded signal. The coefficients are subjected to adaptive quantization, and are run-length and variable-length encoded. Hence respective blocks of transmitted data may include fewer than an 8×8 matrix of codewords. Macroblocks of intraframe encoded data, will include, in addition to the DCT coefficients, information such as the level of quantization employed, a macroblock address or location indicator, and a macroblock type.

Blocks of data encoded according to P or B interframe coding also consist of matrices of Discrete Cosine Coefficients. In this instance however the coefficients represent residues or differences between a predicted 8×8 pixel matrix and the actual 8×8 pixel matrix. These coefficients are also subjected to quantization and run- and variable-length coding. In the frame sequence I and P frames are designated anchor frames. Each P frame is predicted from the last-most occurring anchor frame. Each B frame is predicted from one or both of the anchor frames between which it is disposed. The predictive coding process involves generating displacement vectors which indicate which macroblock of an anchor frame most closely matches the macroblock of the predicted frame currently being coded. The pixel data of the matched block in the anchor frame is subtracted, on a pixel-by-pixel basis, from the block of the frame being encoded, to develop residues. The residues are subjected to the Discrete Cosine Transform and the transformed residues and the motion vectors comprise the coded data for the predictive frames. As for intraframe coded frames, the macroblocks include quantization, address and type information. Note that even though a frame is predictive encoded, if no reasonable block matches can be found, a particular block or macroblock in the predictive frame may be intraframe coded. In addition certain ones of the macroblocks may not be encoded. Macroblocks are skipped by increasing the address of the next coded macroblock.

After the video data is coded, it is arranged according to an MPEG-like protocol. The MPEG hierarchical format includes a plurality of layers each with respective header information. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required, that is start codes and optional extensions may be excluded.

When referring to the MPEG-like signal produced by the present system, what is meant is that a) successive fields/frames of video signal are encoded according to an I, P, B coding sequence, and b) coded data at the picture level is encoded in MPEG-like slices or group of blocks albeit that the number of slices per field/frame may differ and the number of macro blocks per slice may differ. In order to conserve memory at the receiving end of a transmission system, the groups of frames illustrated in FIG. 1 are rearranged so that anchor frames from which B frames are predicted are transmitted before the respective B frames. For example the first four frames (I,B,B,P) in a GOF are transmitted in the sequence order (I,P,B,B). The compressed signal may undergo further manipulation as indicated in U.S. Pat. No. 5,122,875. Ultimately the compressed signal is arranged in transport packets as illustrated in FIG. 2.

Respective transport pockets may include more or less than a slice of data. Thus a particular transport pocket may include data from the end of one slice and data from the beginning of the next subsequent slice. Transport pockets including video data may be interleaved with transport pockets containing other data, e.g., audio. Each transport pocket includes a service type header ST which indicates the type of information included in the respective transport pocket. In this example the ST header is an 8-bit word which indicates whether the data is audio, video or auxiliary data.

Each transport pocket includes a transport header TH immediately following the ST header. The transport header includes a 7-bit macroblock pointer, an 18-bit identifier and a 7-bit record header (RH) pointer. The macroblock pointer is used for segmented macroblock or record header components, and points to the start of the next decodable component. For example, if the particular transport pocket includes macroblock data associated with the end of slice n and the beginning of slice n+1, the data from slice n is placed adjacent the transport header and the pointer indicates that the next decodable data is adjacent the transport header TH.

The 18-bit identifier identifies the current frame type, the frame number (modulo 32), the current slice number, and the first macroblock contained in the transport pocket.

Following the transport header is either a record header, RH, or data. The record header for the video data includes the following information: A 1-bit FLAG which indicates if a header extension, EXTEND, is present. Following the FLAG is an identifier IDENTITY, which indicates a) the field/frame type I, B or P; b) a field/frame number (modulo 32) FRAME ID; and c) a slice number (modulo 64) SLICE IDENTITY. it is to be noted that the transport packet header data comprises redundant information regarding the identity of data in respective packets. That is, identifying indicia is included in both the transport headers, and in the compressed video data headers.

Each transport pocket is terminated with a 16-bit frame check sequence, FCS, which is calculated over all bits in the transport pocket. The FCS may be generated using a cyclic redundancy code.

Figure 2:
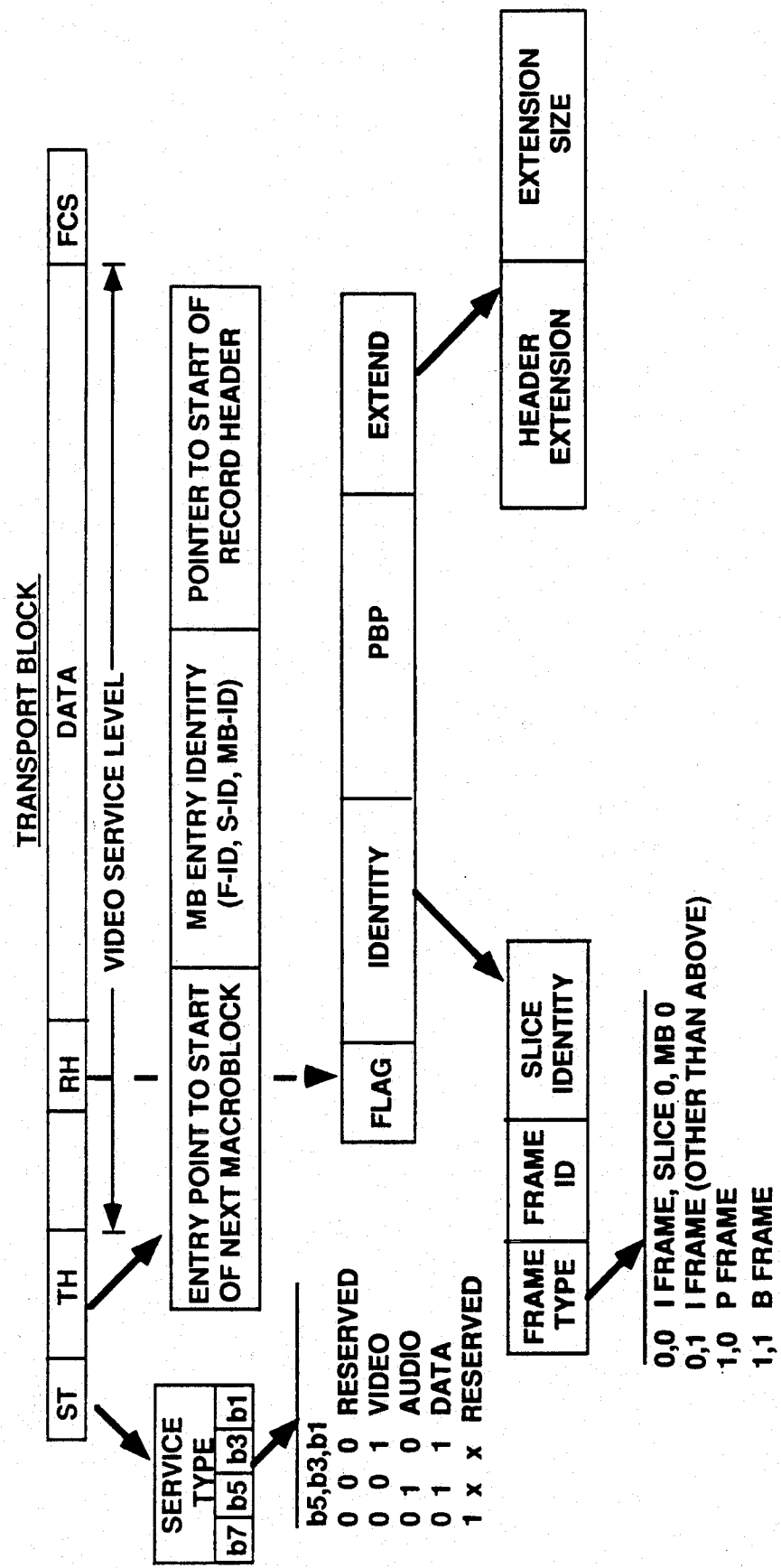
FIG. 2 is a pictorial representation of the format and contents of a transport packet of compressed video data.

The transport pockets shown in FIG. 2 are subsequently applied to a forward error encoder which a) performs, e.g., REED-SOLOMON forward error correction encoding; b) interleaves blocks of data to preclude large error bursts from corrupting a large contiguous area of a reproduced image; and c) appends, e.g., Barker codes to the data for synchronizing the data stream at the receiver. Thereafter the compressed data is applied to applied to a transmission element such as a modem.

Figure 3:
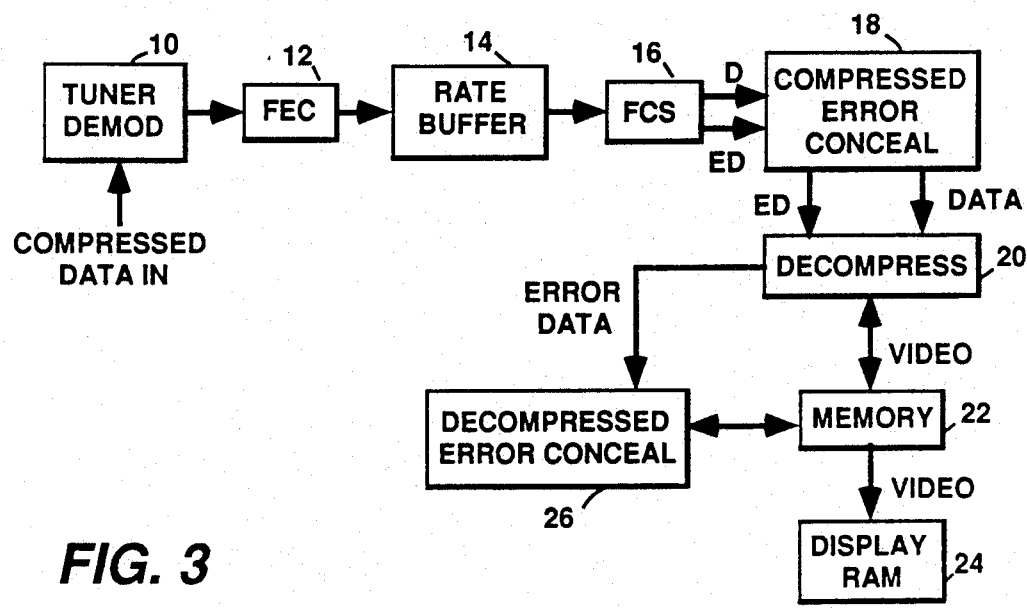
FIG. 3 is a block diagram of receiver apparatus embodying the present invention.

Refer to FIG. 3 which illustrates a general form of a receiver for processing the above described signals. Transmitted signals, from for example, an antenna (not shown) are applied to a tuner/demodulator 10, which provides baseband signal in the form output by the FEC encoder. The baseband signal is applied to a FEC decoder 12, which examines the transmitted signal and corrects errors incurred in the transmission channel, according to its error correction capability. Error corrected data from the FEC 12 is applied to a rate buffer 14 which accepts data at a relatively constant rate from the FEC 12 and outputs data on demand to the subsequent processing elements. Data from the buffer is coupled to an FCS decoder 16, which examines the error corrected data for uncorrected errors according to the FCS check bits appended to the transport packets.

The FCS decoder 16 passes transport packets, D, to element 18 along with an error signal, ED, indicating whether respective transport packets contain data errors. Element 18, responsive to the error data, discards transport packets which include data errors. Error free transport packets are separated into video data and transport header data. The transport header data and error data, ED, are utilized to determine what data is lost, and thereafter to generate and substitute synthetic compressed video data for the lost data. An example of apparatus for creating synthetic compressed video data may be found in U.S. patent application Ser. No. 07/789,245, filed Nov. 7, 1991, and entitled "APPARATUS FOR CONCEALING ERRORS IN A DIGITAL VIDEO PROCESSING SYSTEM". Element 18 passes the combined error free video data and synthetic data to a decompressor 20. In addition element 18 passes error tokens to the decompressor 20, which tokens may provide several functions. For example, it may occur that for the type of data that was lost in a particular transport packet, a better image may be reproduced if decoding that portion of the data is simply skipped by the decompressor 20 rather than generating synthetic compressed video data for application to the decompressor. In this instance the error token is established to affect the sequence of operation of the decompressor. Alternatively, it may occur that it is known a priori, that synthetic compressed data for particular blocks is unlikely to produce acceptable images, and that altering the decoding sequence of the decompressor will not improve over utilizing synthetic compressed data. In this instance particular error tokens are passed to a further error concealment processor 26 which operates on decoded or decompressed video signal.

The decompressor 20 utilizes frames of memory 22 in the decompression process. This memory is arranged to store frames of decoded video signal for use in the process of motion compensated predictive decoding. Decoded image information is subsequently transferred to a display memory 24 from which it may be accessed in raster format for display.

The error concealment element 26 interacts with the decompressed data in memory 22, and substitutes image data identified by the error tokens. Substitution of data is adaptive according to whether the image area under consideration includes significant motion or significant detail. In the latter instance temporally displaced co-located data is substituted for the decoded data, and in the former instance spatially interpolated data is substituted.

Luminance and chrominance data are decompressed separately but by similar processes and then recombined for display. The following discussion regarding error concealment is directed to concealment of errors in the luminance data. Errors in chrominance data are concealed in similar fashion.

Figure 4A:
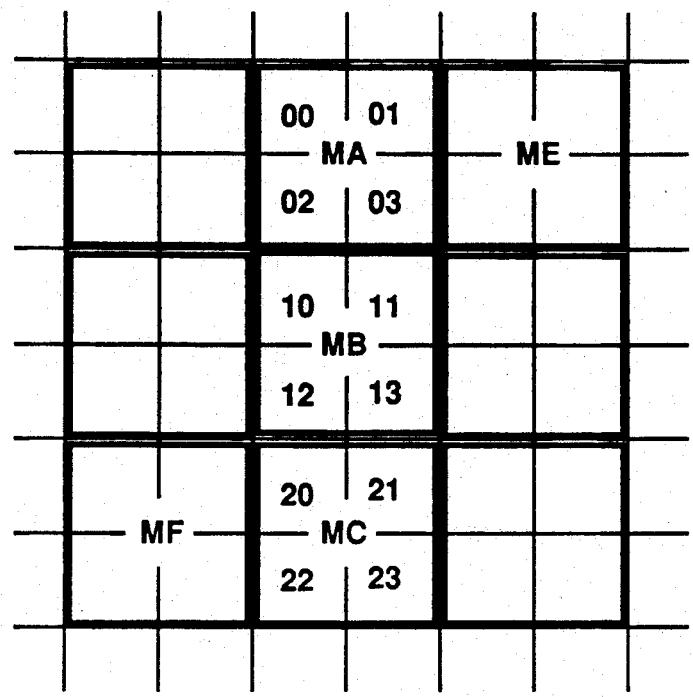
FIGS. 4A and 4B are schematic representations of macroblocks of image data and blocks of image data respectively, which are useful in describing the invention.

Determination of whether error concealment is performed by temporal replacement, or by spatial interpolation is explained with respect to FIG. 4A. FIG. 4A illustrates blocks of data corresponding to a portion of a decoded image. The larger squares represent macroblocks of luminance data and the smaller squares designated ij within each macroblock represent, e.g., 8 by 8 matrices of decoded pixel values. Assume that an error token indicates that macroblock MB is to undergo error concealment. In a first embodiment, macroblock MA and the co-located macroblock in a previously decoded frame are examined to determine the relative amounts of motion and detail associated therewith. Two statistics are calculated. The first statistic, VAR, is calculated according to the equation;

$$VAR = E[(x-x_a)^2]. \quad (1)$$

The second statistic, VAROR is calculated according to the equation;

$$VAROR = E[x^2] - u^2. \quad (2)$$

The values "x" correspond to respective pixel values in macroblock MA, "$x_a$" correspond to respective pixel values in the co-located macroblock in the previously decoded frame, and the value "u" is the average value of the values "x". The function E[ ] represents the expected value of the terms in the argument. The expected value may be calculated over the entire macroblock or a portion thereof. That is, the calculation may be performed over all the pixels of the macroblock MA, or over the pixels in the lower two blocks of pixels 02 and 03, or over the bottom-most lines of pixels in blocks 02 and 03, or over a diagonal line of pixels from for example, the upper left corner of block 00 to the lower right corner of block 03 etc.

The statistic VAR tends to be indicative of local motion between the image represented by macroblock MA and the co-located macroblock in the prior frame. The statistic VAROR tends to be indicative of the local spatial detail in macroblock MA. Because vertically adjacent image areas tend to contain redundant image information, the motion and detail characteristics of macroblock MA and MB will be similar. Thus the characteristics of macroblock MA may be used in deciding the optimal type of error concealment for macroblock MB.

If VAR is greater than a predetermined threshold value, e.g., 64, the area includes not insignificant image motion, and replacement of the macroblock MB with a temporally displaced co-located macroblock may introduce significant motion artifacts in the wider image area. Thus, under this condition, it is preferable to replace MA with interpolated data albeit of potentially lesser image detail than the co-located information. In addition if VAR is greater than VAROR, spatially interpolated data is used a substitute data. Finally if VAR is less than the threshold value or less than VAROR, temporally displaced co-located data is used as substitute or replacement data.

It has been found that slightly better over all performance is attained if the type of replacement data for the upper 10, 11 and lower 12, 13 blocks of macroblock MB are determined independently. Thus statistics $VAR_A$ and $VAROR_A$ are developed for macroblock MA, and statistics $VAR_C$ and $VAROR_C$ are developed for macroblock MC. The statistics $VAR_A$ and $VAROR_A$ are used to determine the type of data replacement for blocks 10 and 11, and the statistics $VAR_C$ and $VAROR_C$ are used to determine the type of data replacement for blocks 12 and 13.

Figure 4B:
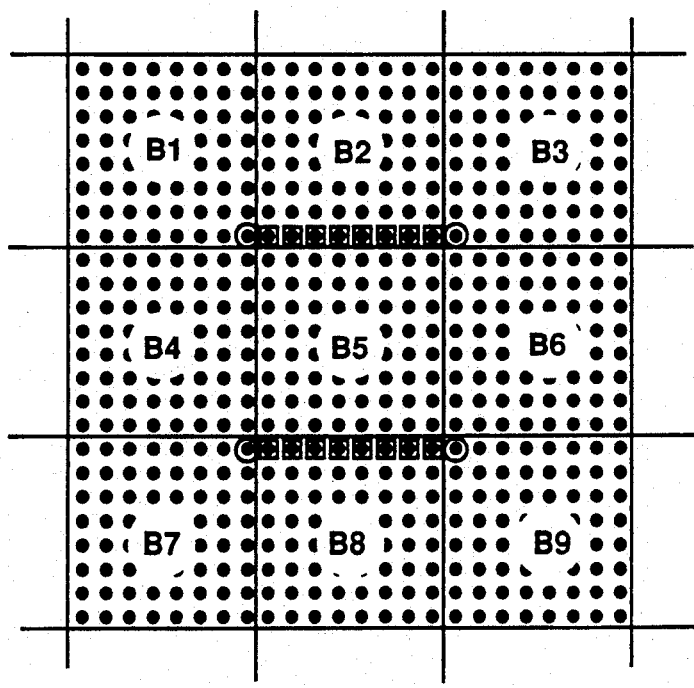

Generation of spatially interpolated values may be performed in a variety of ways. It is important, however, to insure that the boundaries of abutting blocks join without significant discontinuity. Two methods are described with reference to FIG. 4B. In FIG. 4B the delimited squares represent respective blocks of 8×8 pixel values. Assume that the pixel values of block B5 are to be replaced with interpolated pixel values. A first method of generating these values is to calculate vertical, $G_v$, and horizontal, $G_h$, gradients from adjacent blocks of data, then starting with a value from an adjacent block calculate the matrix. For example, a vertical gradient $G_v$ may be calculated by subtracting the average of the circled pixel values in blocks B1 and B3 from the average of the circled pixel values in blocks B7 and B9. similarly a horizontal gradient $G_h$ may be calculated by subtracting the average of the circled pixel values in blocks B1 and B7 from the average of the circled pixel values in blocks B3 and B9. The matrix values are calculated according to the equation;

$$P_{ij}=B1+i^*G_h+j^*G_v \qquad (3)$$

Where B1 is the value of the circled pixel in block B1, and i and j are the horizontal and vertical coordinates of the pixels in the matrix referenced to the upper left corner. A second method is to generate a vertical gradient for each column of pixels from the pixel values in the vertically adjacent blocks. For pixels in column 5 a vertical gradient $G_v$ may be calculated by substracting the pixel value in the square box in column 5 of block B2 from the pixel value in the square box in column 5 of block B8. The respective pixel values in column 5 of block B5 are calculated according to the equation;

$$P_{5j}=B2_{5,8}+j^*G_v. \qquad (4)$$

The Value $B2_{5,8}$ is the value of the fifth pixel in the eighth row of block B2.

As a further alternative the blocks of pixel values may be generated from local pixel values by the known gradient descent method, though this method tends to require somewhat more computation.

In an image area, temporal replacement of blocks must be performed before replacement of spatially interpolated data. This sequence is necessary to insure that data is available to generate interpolated data. For example, assume that blocks B1 and B9 are to be replaced with temporally co-located data and block B5 with interpolated data generated according to equation 3. If blocks B1 and B9 are not replaced first, correct gradients $G_v$ and $G_h$ may not be calculated, resulting in a possible image discontinuities at the block boundaries.

Figure 5:
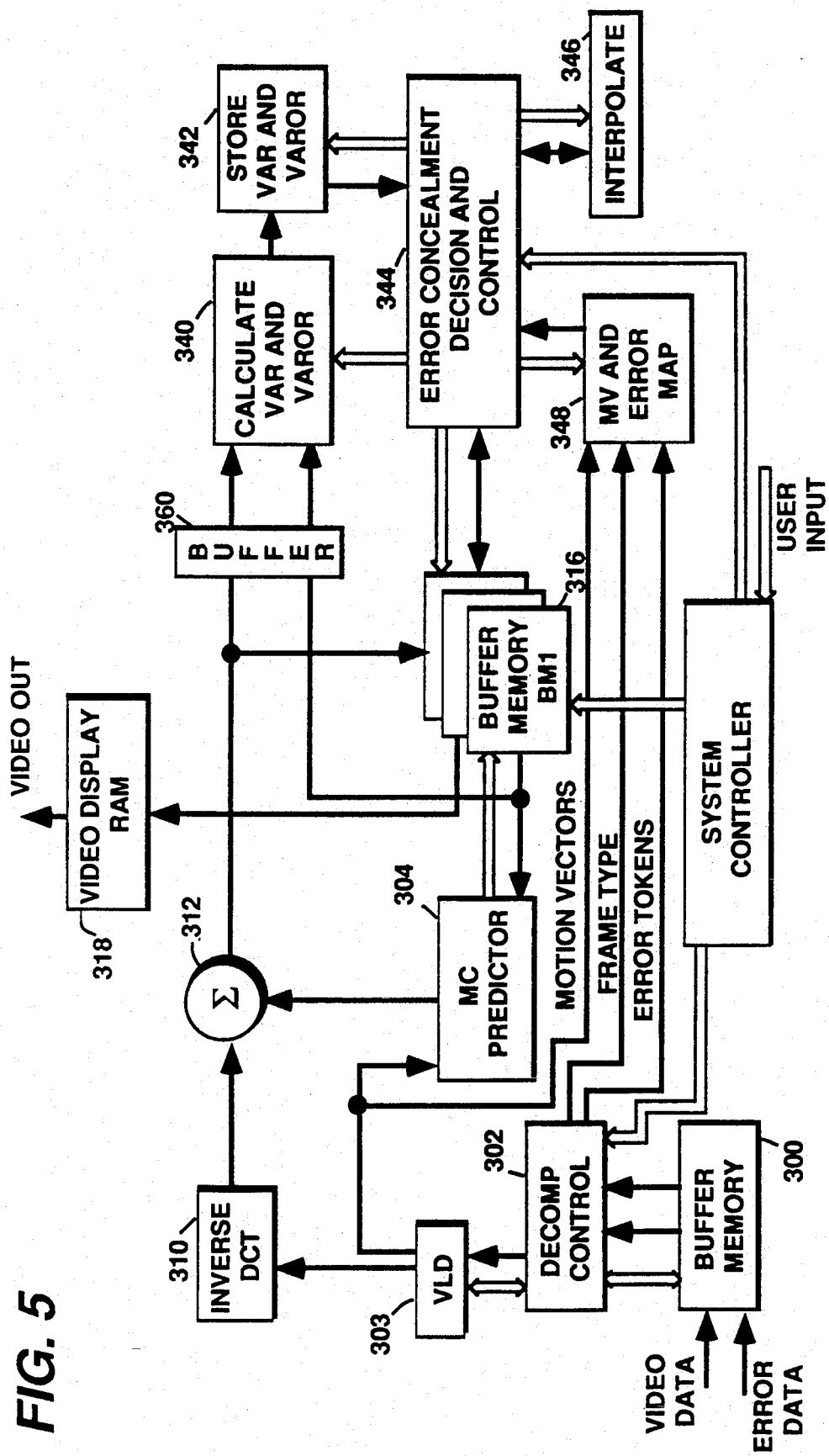
FIG. 5 is a block diagram of the video signal decompression and post-decompression error concealment apparatus embodying the invention.

FIG. 5 is a block diagram including the decompression apparatus and the post-decompression concealment apparatus. Elements 300–318 correspond to the decompressor circuitry. Operation of this type of circuitry is generally known. Briefly, compressed video data, and error tokens are buffered in a memory 300, and applied to a controller 302. The controller sends the video data to a variable length decoder 303 which performs variable length decoding, inverse run length decoding, inverse differential pulse code modulation decoding, dequantizing, etc., as appropriate. Decoded video headers are returned to the controller 302 for controlling the further decoding of the signal. The controller is in effect a state machine for performing fixed sequences of decoding operations, which sequences are determined by the current video header data and the history of data processed. Decoded DCT coefficients are directed to the inverse DCT element 310, which performs an inverse Discrete Cosine Transform on the coefficients and outputs pixel values (I frames) or residue values (P or B frames) to the adder 312. Decoded motion vectors are applied to the motion compensated predictor 304. Responsive to the motion vectors, the predictor accesses previously decompressed macroblocks of pixel values from the buffer memory 316, and applies these pixel values to the adder 312 (for decoding P or B frames). When I frames are being processed the predictor 304 applies a zero value to the adder 312.

Decompression of I frames comprises passing the inverse DCT processed pixel values through the adder 312 and storing them in a portion of memory 316 for use in decompressing P or B frames. The I frame pixel values are also coupled from memory 316 to a display memory 318, from which they may be read in raster format.

Decompression of a P frame comprises accessing, according to the direction of respective motion vectors, macro blocks of the previously decoded I frame (or a previously decoded P frame subsequent the last-most I-frame) and applying the pixel values of the respective blocks in the macroblocks to the adder 312. Corresponding blocks of decoded residues are applied from the IDCT 310 to the adder 312, which produces sums corresponding to respective decoded pixel values for the current P frame. These pixel values are coupled to a portion of the memory 316 not occupied by the last-most decoded I or P frame and are utilized in decoding subsequent B and P frames. This P frame data is coupled to the display memory 318 after subsequent B frames are decoded (the B frames that occurred before the P frame in the coding sequence).

B frames of compressed data are decoded similar to the P frames except that macroblocks of data may be accessed from the memory 316 from either or both of the anchor frames between which the B frames were originally disposed before encoding. If data is accessed from both frames for a particular macroblock, this data is interpolated or averaged before application to the adder to be added to the residue values. B frames are not stored in the memory 316, because they are not used in decoding subsequent frames. Hence the B frame data is passed through the memory apparatus 316 to the display memory 318.

The post-decompression error concealment apparatus of FIG. 5, is arranged to conceal errors in decoded I and P frames, and not decoded B frames. Post-decompression concealment of errors in B frames is not provided in the FIG. 5 arrangement. This does not significantly affect the overall display because, decoded B frames are not used in decoding subsequent frames, hence errors in B frames are short in time duration (one frame) and do not propagate into subsequent frames. The system of FIG. 5 utilizes the decompressor buffer memory 316 as a repository from which signal may be sourced and in which signal may be replaced. This memory does not store B frames, and as such B frames are not available for concealment processing. However B frames may be processed for error concealment similar to P frames, as described below, simply by incorporating additional memory for storing the B frames.

If provision is not made for storing decoded B frames, calculation of the statistics VAR and VAROR is performed using co-located data in successive anchor frames. That is, with respect to the frame sequence illustrated in FIG. 1, the VAR and VAROR statistics for any anchor frame (I or P) are calculated using macroblocks from the anchor frame immediately to its left (I or P). In addition co-located macroblocks/blocks for substitution (temporal replacement) in respective anchor frames are accessed from the anchor frame located immediately to its left. Note if provision is made for storing and processing B frames, then the statistical calculations for any frame would be made utilizing data from the immediately prior frame in the sequence, and temporal substitution data would be accessed from the immediately prior frame in the sequence.

First consider error concealment in I frames, and refer to FIGS. 4A and 5. From FIG. 4A it will be recognized that when the pixels of macroblock MA are output from the adder 312, it is not yet known whether the values VAR and VAROR will be required to be generated over the macroblock MA, i.e. whether macroblock MB is to undergo error concealment. On the other hand, when the macroblock MB is being decoded, and the values VAR and VAROR are required to be generated over macroblock MA, pixel data for macroblock MA as well as its co-located counterpart must accessed from memory in order to perform the calculations. This may create memory access contention. To avoid such contention, the values VAR and VAROR are generated for all macroblocks as respective macroblocks are decoded. The results are stored in a memory may 342, and are available whenever an error token indicates that a particular macroblock is to undergo error concealment processes.

I frame macroblocks are decoded in a predetermined order. As macroblocks of I frame data are decoded, co-located macroblocks from the last decoded P frame are accessed from the memory 316 under the control of the error concealment, decision and control element 344. The I frame data and co-located P frame data are applied to a calculator 340, which generates the values VAR and VAROR. These values are stored in memory 342 for furture use. As the I frame macroblocks are decoded the controller 302 outputs corresponding error tokens, if applicable, which are stored in a further memory map 348. In addition the respective frame type information is stored in memory map 348. During decoding of P frames, motion vectors from the VLD 303, for corresponding macroblocks are also stored with the error tokens.

Several rows of macroblocks are decoded/decompressed before the error concealment process is initiated to avoid memory access contention in the buffer memory 316. Once the concealment process is initiated, the control element 344 steps through the error tokens in the error map 348. If an error token indicates that data in a macroblock is to be replaced, the values VAR and VAROR generated over the appropriate macroblocks, are accessed from the memory map 342 and compared. If the comparison indicates that the pixel data in the macroblock is to be replaced with temporally displaced co-located data, that data is accessed from the memory 316 (the portion storing the previously decoded P frame), and used to replace the I frame macroblock data in memory 316 (the portion storing the I frame currently being decoded), all under the control of element 344.

If the comparison indicates that the macroblock is to be replaced with interpolated data, that indication is placed in a queue, with appropriate action taken, for example, two rows of macroblocks following the comparison. This insures that temporal replacement has been performed, where appropriate, around all blocks that are to be replaced with interpolated data, so that boundary data is available for generating the interpolated data. Alternatively the system may be programmed as a two pass system wherein temporal replacement is performed (where appropriate) over the entire frame, and then interpolated blocks are substituted (where appropriate) over the entire frame. When a block of data is to be replaced with interpolated data, the control element 344 accesses the boundary data from the neighboring blocks in the I frame in memory 316, and provides it to the interpolator 346. Interpolator 346 generates the block of data which is accessed by the control element 344, and substituted into the appropriate macroblock in the I frame stored in the memory 316.

Error concealment for P frames is performed similarly, except that when blocks are replaced with temporally displaced data, it is not co-located data. Refer to FIG. 4A, and remember that P frames are interframe encoded. The compressed signal includes motion vectors which point to the optimum macroblocks in the prior anchor frame from which macroblocks in the current P frame may be predicted. For example, the motion vector associated with macroblock MF in the current P frame, may indicate that the macroblock ME in the prior anchor frame was used in predicting the macroblock MF in the current P frame. The co-located macroblock MF in the prior anchor frame may bear little resemblance to the macroblock MF in the current P frame. Hence, when temporal replacement is performed, it is done using blocks of data indicated by appropriate motion vectors. But what are the appropriate motion vectors? Note that the motion vectors are coded in relative terms, that is they indicate how far to the right or left and above or below the location of the current macroblock the predicting macroblock will be found in the prior frame. Now if it is assumed that a high degree of redundancy exits between vertically adjacent image portions, then one might expect that the motion vectors from vertically adjacent macroblocks will also tend to be similar, and such is the case. Therefore there are several options, depending upon the complexity one wishes to incorporate in his system. For example, consider that data in macroblock MB is to be replaced with temporally displaced data. If the particular system calculates VAR and VAROR over only macroblock MA for the entire macroblock MB, then the motion vector for locating the temporally displaced data to be substituted in macroblock MB, may be the motion vector associated with macroblock MA. If the particular system calculates VAR and VAROR over macroblock MA for the upper two blocks of macroblock MB, and calculates VAR and VAROR over macroblock MC for the lower two blocks of macroblock MB, then the motion vector associated with macroblock MA may be used for locating data for the upper two blocks of macroblock MB and the motion vector associated with macroblock MC may be used for locating substitute data for the lower two blocks of macroblock MB. Alternatively, in both instances the motion vectors associated with both macroblocks MA and MB may be averaged to develop the appropriate motion vector.

Motion vectors associated with horizontally adjacent macroblocks may also be used for locating substitute data for replacement in P frames, however in the MPEG-like coding schemes, error loss and/or propagation tends to be in the horizontal direction. Therefore it is very likely that reliable motion vectors may not be present in horizontally adjacent macroblocks.

Considering calculation of the values VAR and VAROR for P frame error concealment, the appropriate macroblocks in respective frames occur automatically. When a macroblock of the P frame is being decoded and output from the adder 312, the appropriate macroblock indicated by the associated motion vector is provided from the memory 316 in the normal decoding process. Thus no changes are required in the apparatus for calculating VAR and VAROR.

What is claimed is:

1. Adaptive error concealment apparatus, for concealing errors in video signal decoded as blocks of pixels, comprising:
   a source of video signal occurring in blocks of coded data representing respective image areas, each area being represented by a plurality of pixels;
   means coupled to said source for detecting errors in said blocks of coded data, generating error tokens indicating blocks of coded data containing errors, discarding blocks of coded data with errors, and passing error free blocks of coded data;
   means for decoding said error free blocks of coded data on a block-by block basis, and generating corresponding blocks of pixel values representing said image areas;
   means, responsive to said error tokens and pixel values, for generating a first indicia related to the amount of image detail in at least one block of pixel values adjacent to a discarded block of pixel values;
   means, responsive to said error tokens and pixel values, for generating a second indicia related to image movement in said at least one block of pixel values adjacent to said discarded block of pixel values, with respect to an image in a previously decoded frame;
   means for comparing said first and second indicia, and providing first and second types of pixel data for said discarded block of pixel values, if the amount of image detail is greater and lesser then said image movement respectively.

2. The apparatus set forth in claim 1 wherein said means for providing first and second types of pixel data comprises:
   means for selecting pixel values from blocks of pixel values adjacent said discarded block of pixel values, for generating a block of interpolated pixel values therefrom, said block of interpolated pixel values corresponding to said second type of pixel data; and
   means for selecting a block of pixel values from a frame of previously decoded video signal, said selected block corresponding to said first type of pixel data.

3. The apparatus set forth in claim 1 wherein said first and second types of pixel data correspond to blocks of temporally displaced pixel values and blocks of interpolated pixel values respectively.

4. The apparatus set forth in claim 1 wherein said means for generating a first indicia comprises, means for calculating the difference between the square of the average value of pixel values in said at least one block and the expected value of the square pixel values in said at least one block.

5. The apparatus set forth in claim 1 wherein said means for generating a second indicia comprises, means for calculating the expected value of the square of the difference between corresponding pixel values in said at least one block and pixel values from a co-located block in a temporally displaced frame.

6. In a system for decoding video signal arranged in blocks of coded data to produce corresponding blocks of pixel values representing respective image areas, apparatus for concealing errors in blocks of pixel values, comprising:
   means responsive to said coded data for generating error tokens identifying blocks of coded data containing errors;
   means responsive to said error tokens for identifying blocks of pixel values (designated errored blocks), corresponding to blocks of coded data containing errors;
   means responsive to decoded pixel values for estimating the relative amount of image motion, and relative amount of image detail in said errored blocks of pixel values; and
   means for replacing respective errored blocks of pixel values with blocks of interpolated data if the estimate of relative motion for a respective block is greater than the estimate of relative image detail, and replacing respective errored blocks of pixel values with blocks of temporally displaced pixel values if the relative image detail for said respective blocks is greater than the estimate of relative motion.

7. The system set forth in claim 6 wherein said means for substituting respective blocks of pixel values substitutes said blocks of temporally displaced pixel values before substituting said blocks of interpolated data.

8. The system set forth in claim 6 wherein said means responsive to decoded pixel values for estimating the relative amount of image motion, and relative amount of image detail in said errored blocks of pixel values, comprises:
   means for generating a first indicia related to the amount of image detail in at least one block of pixel values adjacent to said errored block of pixel values;
   means for generating a second indicia related to image movement in said at least one block of pixel values adjacent to said errored block of pixel values, with respect to an image in a previously decoded frame; and
   means for comparing said first and second indicia.

9. The system set forth in claim 6 wherein said means for substituting respective errored blocks of pixel values with blocks of interpolated data comprises:
   means for selecting pixel values from blocks of pixel values adjacent said errored block of pixel values, and generating therefrom said interpolated data.

10. The system set forth in claim 6 wherein said coded data includes motion vectors associated with respective blocks and said means for substituting blocks of temporally displaced pixel values includes:
    means for storing motion vectors;
    means responsive to said error tokens for selecting motion vectors associated with blocks adjacent to said errored block; and
    means responsive to said selected motion vectors for determining a temporally displaced block of pixel values for substitution.

* * * * *